United States Patent
Zuckerberg et al.

(10) Patent No.: US 8,478,658 B2
(45) Date of Patent: *Jul. 2, 2013

(54) AUCTION-BASED SELECTION AND PRESENTATION OF POLLS TO USERS

(75) Inventors: Mark E. Zuckerberg, Palo Alto, CA (US); Adam D'Angelo, Mountain View, CA (US); Robert Kang-Xing Jin, Palo Alto, CA (US); Timothy Kendall, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,696

(22) Filed: Aug. 1, 2012

(65) Prior Publication Data
US 2012/0296749 A1 Nov. 22, 2012

Related U.S. Application Data

(63) Continuation of application No. 12/156,091, filed on May 28, 2008, now Pat. No. 8,249,943.

(60) Provisional application No. 60/932,712, filed on May 31, 2007.

(51) Int. Cl.
*G06Q 30/00* (2012.01)

(52) U.S. Cl.
USPC .......... 705/26.3; 705/14.44; 705/319

(58) Field of Classification Search
USPC .......... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | |
|---|---|---|---|
| 6,477,504 B1* | 11/2002 | Hamlin et al. | 705/7.32 |
| 6,513,014 B1* | 1/2003 | Walker et al. | 705/7.32 |
| 6,539,392 B1* | 3/2003 | Rebane | 705/7.31 |
| 2001/0032132 A1* | 10/2001 | Moran | 705/14 |
| 2001/0032133 A1* | 10/2001 | Moran | 705/14 |
| 2003/0009362 A1* | 1/2003 | Cifani et al. | 705/7 |
| 2003/0078804 A1* | 4/2003 | Morrel-Samuels | 705/1 |
| 2005/0055306 A1* | 3/2005 | Miller et al. | 705/37 |
| 2005/0075919 A1* | 4/2005 | Kim | 705/10 |
| 2005/0198031 A1* | 9/2005 | Pezaris et al. | 707/9 |
| 2006/0080221 A1* | 4/2006 | Murakami | 705/37 |
| 2006/0184417 A1* | 8/2006 | Van der Linden et al. | 705/14 |
| 2007/0192166 A1* | 8/2007 | Van Luchene | 705/10 |
| 2007/0233503 A1* | 10/2007 | Meyer et al. | 705/1 |
| 2009/0055268 A1* | 2/2009 | Knoller et al. | 705/14 |
| 2009/0076914 A1* | 3/2009 | Coueignoux | 705/14 |
| 2010/0138291 A1* | 6/2010 | Silverman et al. | 705/14.45 |
| 2010/0146416 A1* | 6/2010 | Palmer | 715/762 |
| 2011/0184780 A1* | 7/2011 | Alderson et al. | 705/7.32 |

OTHER PUBLICATIONS

Omer Rana et al. "Business Models for Online Social Networks: Challenges and Opportunities", Copyright © 2012, IGI Global, DOI: 10.4018/978-1-4666-0879-5.ch6.12.*

* cited by examiner

*Primary Examiner* — Naeem Haq
(74) *Attorney, Agent, or Firm* — Fenwick & West LLP

(57) ABSTRACT

A system and method for auction based polling is provided. Parameters related to a poll are received from a first user. Parameters related to a poll are received from a first user. A query is associated with the poll. A priority of the poll is determined based on the parameters. The poll is distributed to one or more second users according to the priority. Results to the poll are gathered. The results are reported to the first user.

21 Claims, 6 Drawing Sheets

FIG. 3

AUCTION-BASED SELECTION AND PRESENTATION OF POLLS TO USERS

CROSS-REFERENCE TO RELATED APPLICATIONS

The present application is a continuation of U.S. patent application Ser. No. 12/156,091, filed May 28, 2008, which claims the priority benefit of U.S. Patent Application No. 60/932,712, filed May 31, 2007, titled, "Systems and Methods for Auction Based Polling," which are each hereby incorporated by reference in their entirety.

BACKGROUND OF THE INVENTION

1. Field of the Invention

The present invention relates generally to social networking, and more particularly to systems and methods for auction based polling.

2. Description of Related Art

Conventionally, survey firms provide various conduits for companies to survey individuals in a public or private arena. With the popularity of the Internet and online venues, these survey firms often survey individuals via the Internet. A company or individual can pay the survey firms to survey these individuals, groups, and so forth using a variety of media outlets available online.

Typically, the survey firm accrues results from polls taken on behalf of the company or the individual and provides the results to the company or the individual. The results may be provided based on information input by the company or the individual or according to any other criteria. The survey firm may also provide demographic data about the users that participated in the polls.

However, the company or the individual that requested the poll sometimes desires faster and event nearly immediate results. In addition, a lengthy, typically offline, registration process with the survey firm is often involved for scheduling the polls. Further, the survey firm, rather than a poll requester, frequently specifies a price for the poll.

SUMMARY OF THE INVENTION

The present invention provides a system and method for auction based polling. Parameters related to a poll are received from a first user. A query is associated with the poll. A priority of the poll is determined based on the parameters. The poll is distributed to one or more second users according to the priority. Results to the poll are gathered. The results are reported to the first user.

BRIEF DESCRIPTION OF THE DRAWINGS

FIG. 3 illustrates an exemplary poll creation screen;

DETAILED DESCRIPTION

Figure 1:
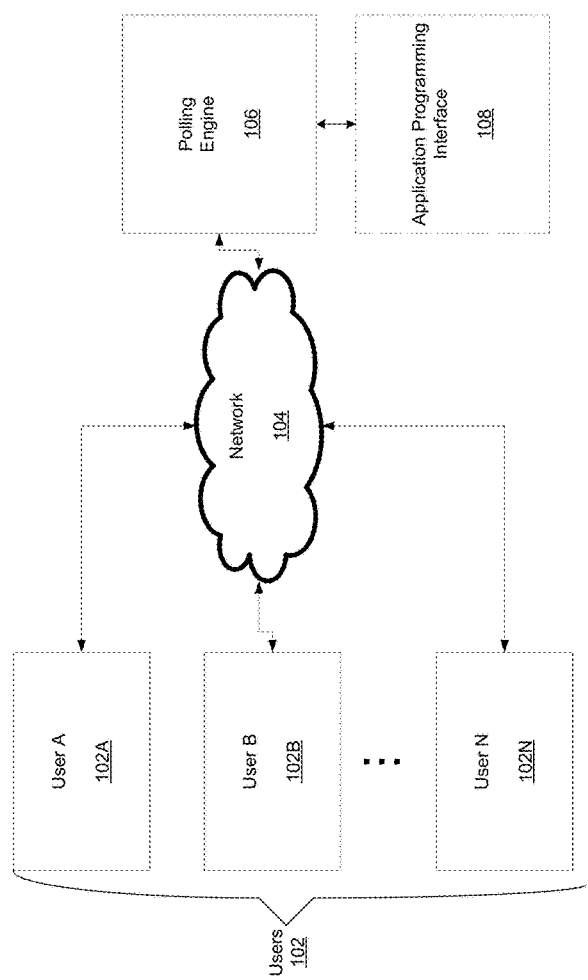
FIG. 1 illustrates a block diagram of an exemplary environment for auction based polling.

FIG. 1 illustrates a schematic diagram of an exemplary environment for auction based polling. One or more users 102, such as a user A 102A, a user B 102B, and up to a user N 102N, are in communication with a polling engine 106 via a network 104. The polling engine 106 may be associated with a social network, one or more servers operating the social network, an advertising engine, or any other device or application capable of providing any type of services via the network, such as a web-based panel. The users 102 may access the services provided by the polling engine 106 via the network 104. Optionally, one or more of the users 102 may access the polling engine 106 directly.

The users 102 may access the polling engine 106 via a computing device, such as a laptop or desktop computer, a cellular telephone, a personal digital assistant (PDA), a set top box, and so forth. The users 102 may view data about social network members, enter data about the users 102, themselves, join social network groups, and so forth, via the polling engine 106. The users 102 are typically members of a social networking website associated with the polling engine 106, for example, and thus comprise the social network members, themselves. However, any of the users 102 or other individuals not associated with the polling engine 106 can conduct a poll or survey of the members of the social networking website by interfacing with an application programming interface (API) 108 associated with the polling engine 106. For example, the users 102 that are non-members of the social networking website may conduct polls of the users 102 that are members of the social networking website and the users 102 that are members of the social networking website may also conduct polls of the users 102 that are also members of the same social networking website.

In other embodiments, the users can access the polling engine 106 via an advertising engine (not shown) that serves advertisements to various users. Any type of website, network, and so forth may connect the users 102 with the polling engine 106.

The users 102, such as the users A 102A through users N 102N, may generate polls utilizing the polling engine 106. According to some embodiments, a user accesses the polling engine 106 via the API 108, such as via a website hosted by the polling engine 106. The user enters data into the API 108, such as desired questions, for conducting a poll, survey, or any other type of query of the users 102 associated with the polling engine 106. The API 108 may be provided specifically for queries or polls, or in alternative embodiments, for various other interactions with the polling engine 106 as well.

The user accessing the API 108 can also enter auction data. For example, the user 102 (i.e. the poll requester) can specify a price per answer the user 102 is willing to pay for answers to the survey, poll, or query. The polling engine 106 can rank the poll from the poll requester against other requested polls according to the price per answer and fulfill the polls according to the bids (i.e., the price per answer). In some embodiments, a hierarchy may be assigned to the polls according to the bids. Alternatively, some polls may not be fulfilled according to the bids.

In some embodiments, the poll requester can, more specifically, bid the price per answer for varying categories or groups of the users 102 associated with the polling engine 106. For example, the price per answer for computer science majors from MIT may be higher than the price per answer for computer science majors from Harvard. Any type of grouping or categories for potential survey recipients is possible. The poll requester may specify the categories or the polling engine 106 may suggest categories. The categories associated with the users 102 may be selected from a drop down menu or other menu offering predetermined categories of the users 102, or by any other means known in the art.

Various methods of providing poll details to the polling engine 106 may be employed. The poll requester may enter a poll question and response choices, fir example via a web page. Alternatively, the polling engine 106 may provide the API 108 for users to write programs and generate polls, themselves, to automatically base decisions on poll results and/or generate new polls based on the results of one or more previous polls.

The poll requester may also be able to enter data regarding what the poll requester is willing to pay to conduct the poll via the API 108, thus creating an auction-like process. For example, the poll requester can specify a bid per answer, a bid per user, and/or a bid per impression that the poll requester is willing to pay. The bid per user may include a price per grouping or type of user, such as users from a particular geographical location or school. The bid per impression may include a price per instant the poll appears to the users 102 or a group of the users 102.

The bid may be based on profiles associated with the users 102. As discussed herein, the users 102 that are members of the social networking website may be polled by other members and/or by the users 102 that are non-members. For example, the poll requester may bid a dollar ($1.00) for answers by the users 102 who indicate in a profile that the users' 102 favorite food is pizza. Bid types may be combined according to some embodiments. For example, the poll requester may bid one dollar ($1.00) for each answer and another one dollar ($1.00) for each impression related to the users 102 that attend Stanford University. Any type of combination of bidding methods is within the scope of the present invention.

The polling engine 106 can rank all polls requested according to the price per answer or impression and fulfill the polls according to the bids (i.e., the higher priced polls first). Priority may alternatively be based on total cost, regardless of the number of requested users. Any type of hierarchy or priority may be calculated utilizing any data available to the polling engine 106.

According to some embodiments, the polling engine 106 can determine a predicted response rate to the poll. The predicted response rate may be utilized by the polling engine 106 to select the polls that win an auction. For example, a poll with a high predicted response rate may be more desirable because the poll may generate more revenue than a poll that is predicted to have a low response rate.

Figure 2:
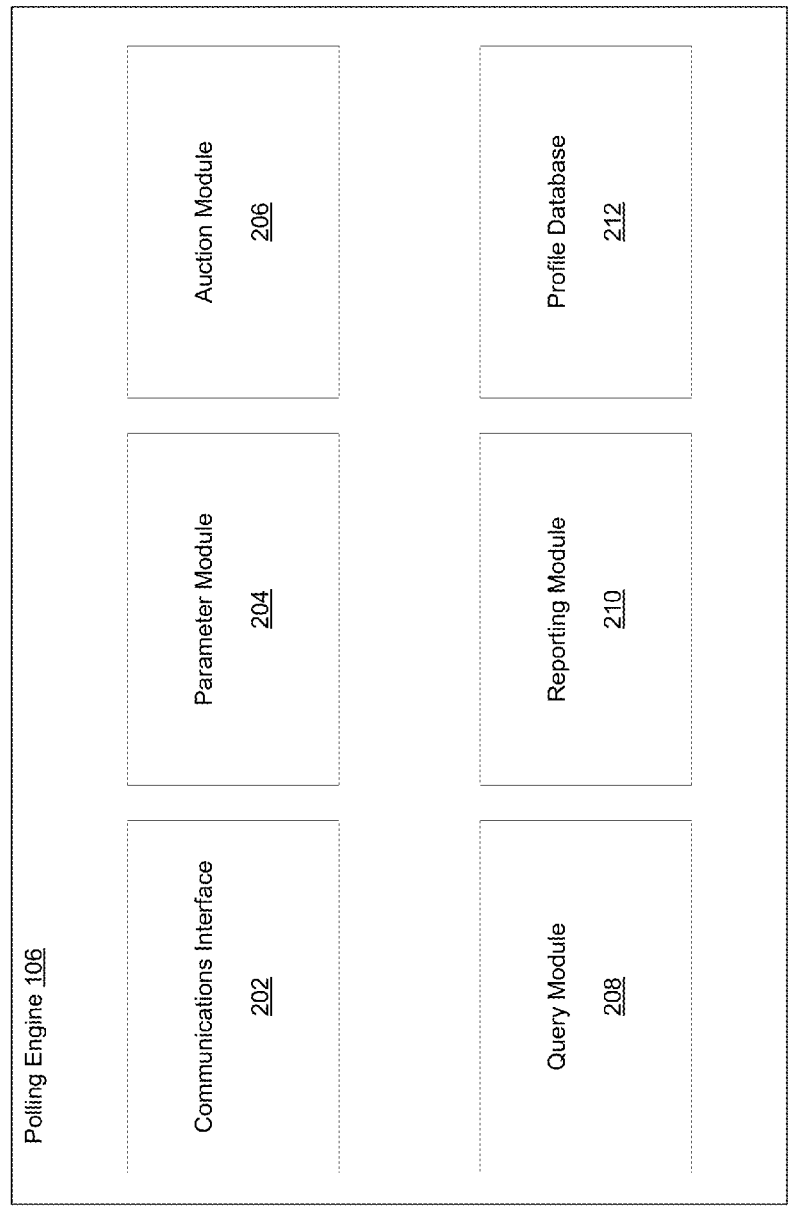
FIG. 2 illustrates a block diagram of an exemplary social network engine.

Referring now to FIG. 2, a block diagram of an exemplary polling engine, such as the polling engine 106 discussed in FIG. 1, is illustrated. A communications interface 202 is provided for receiving data from the users 102, such as poll requesters or other users, and sending data to the users 102. As discussed herein, the users 102 that comprise poll requesters may further comprise members of the social networking website or non-members of the social networking website. The communications interface 202 may be utilized for sending polls or other queries to the users 102 and gathering responses from the users 102.

Typically, the users 102 may access a website associated with the polling engine 106. For example, the polling engine 106 can host the social networking website which the users 102 can visit to interact with one another. The website can display various types of data about the users 102 to one another, such as profile information, relationships between users, poll results, and other information. The users 102 may belong to particular communities within the social networking website, such as communities categorized according to school attended, workplace, geographical location, etc. The communities may be utilized by the polling engine 106 for grouping or categorizing the users 102. As discussed herein, different bids may be provided by a poll requester for the different communities comprised of the users 102.

A parameter module 204 is provided for receiving parameters associated with a requested poll via the API 108. The poll requester inputs various desired parameters, such as a price per answer, price per impression, price per type of user, questions for the poll, and so forth.

An auction module 206 is provided for evaluating the bids entered by the poll requester. The auction module 206 can compare the various parameters input to determine a hierarchy for fulfilling the polls from each of the poll requesters. The auction module 206 may fulfill polls in an order based on the bid per answer, the bid per impression, the bid per type of user, a combination of types of bids, and so forth.

The total amount of each bid may also be considered. For example, a user X may bid ten dollars ($10.00) per answer for a maximum of 100 answers while a user Y bids five dollars ($5.00) per answer for a maximum of 300 answers. The auction module 204 may then rank user Y's bid as higher because the net bid is higher than user X's bid (i.e., $1500 net rather than $1000). Any type of ranking system may be employed by the auction module 204. For example, the polls may be ranked according to price, difficulty of gathering responses or fulfilling the poll, originality of poll, and so forth. Further, as discussed herein, different bids for different type of users responding to the poll may be entered.

A query module 208 conducts the polls by sending out queries to the users 102 and gathering responses from the users 102. The query module 208 may fulfill the polls in an order specified by the auction module 206.

If desired, the query module 208 may suggest follow up or alternative poll-related queries to the poll requester. For example, based on responses from the users 102 to the polling queries, the polling module 206 may suggest other poll categories or subject matter in which the users 102 may be interested. The query module 208 may also suggest alternative language for posing poll related queries to the users 102 based on information about the users 102, such as previous polling responses, user profile data, and so forth.

A reporting module 210 utilizes the polling responses gathered by the query module 208 to generate a report for the poll requester. The reporting module 210 may access profile data for the users 102 that responded to the poll to generate the report and/or any other type of data. The report may include demographics about the users 102 that responded, for example.

A profile database 212 that includes information about the users 102 may need to be accessed by the reporting module 210 and/or the query module 208 according to some embodiments. For example, the profile database 212 may be utilized in order to access and provide demographic information about the users 102, to help the query module 208 determine which of the users 102 should receive a query, and so forth. Access to data about the users 102 or to the users 102, directly, may be restricted by the polling engine 106. Thus, the polling engine 106 may provide only certain demographic data to the poll requester about the users 102 that respond to polls.

The poll may be sent to specific users 102 or the poll may be posted on a social networking website associated with the polling engine 106. If the poll is posted rather than sent, the users 102 that respond to the poll may need to be compared with profile data to determine if the users 102 meet the parameters specified by the poll requester, such as female MIT students. For example, the parameter module 204 may ignore responses from the users 102 identified through profile information as graduates of Harvard if the poll requested that only students from MIT respond to a posted poll.

Although FIG. 2 shows various modules associated with the polling engine 106 (e.g., the communications interface 202, the parameter module 204, the auction module 206, the query module 208, the reporting module 210, and the profile database), fewer or more modules may be associated with the polling engine 106 and still fall within the scope of various embodiments. For example, a polling database (not shown) may be coupled to the polling engine 106 for storing data about poll responses received from the users 102.

Figure 3:
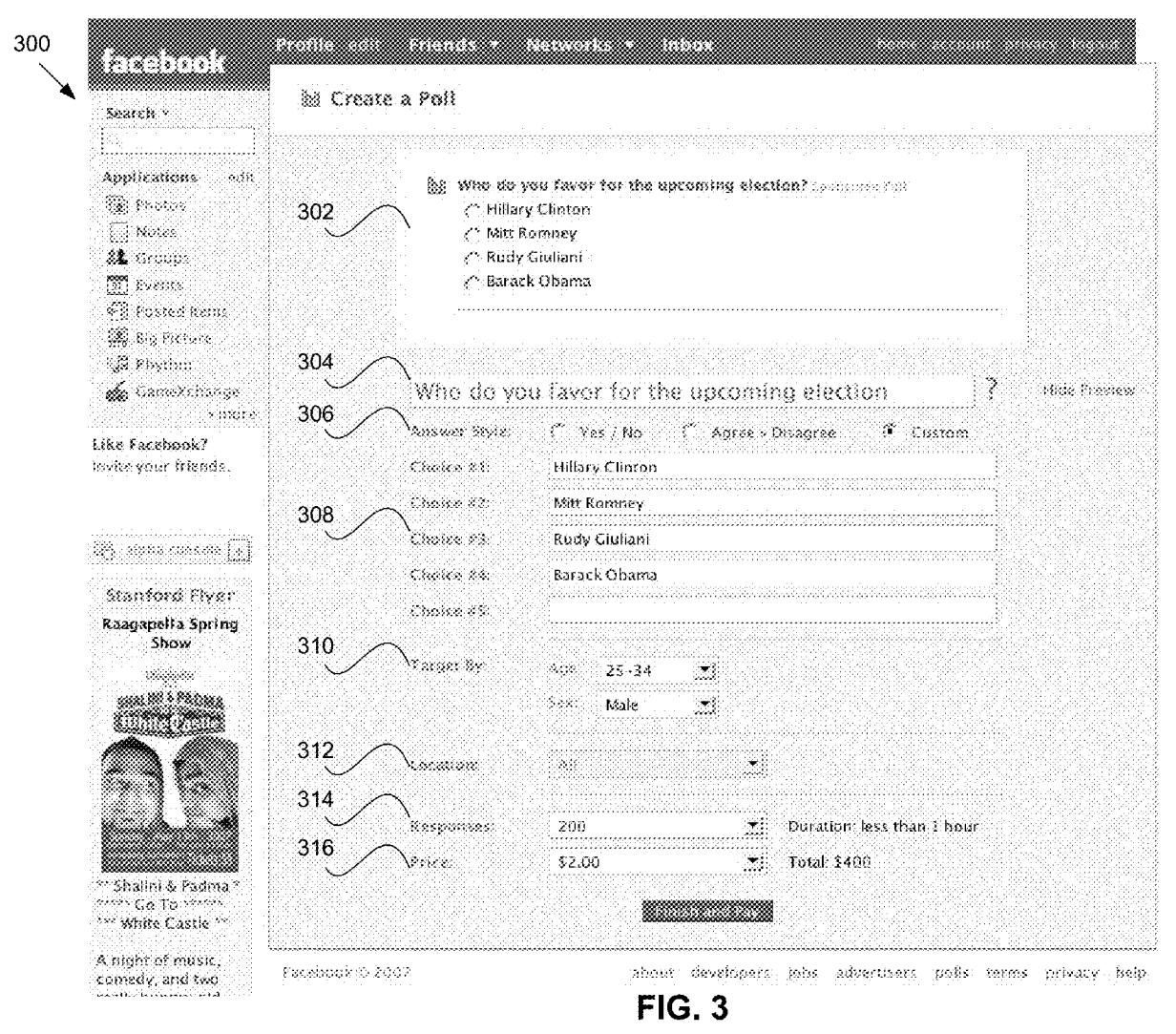

Referring now to FIG. 3, an illustration of an exemplary poll creation screen 300 is shown. As discussed herein, users can access the poll creation screen 300 through any type of interface. The "upcoming election" poll 302 appears on the screen once completed by the poll requester. The poll requester can enter a query or any other text in a query box 304. An answer style 306 is then selected indicating what type of answers the users 102 answering the "upcoming election" poll 302 can input. The poll requester may allow the users being polled to answer in a yes/no format, an agree/disagree format, a custom format, such as a text input, or any other desired format.

One or more answer choices 308 for the poll 302 may also be input by the user, as shown on the poll creation screen 300. For example, as shown in FIG. 3, five multiple choice answers are provided from which the users being polled may choose. One of those multiple choices allows for a write-in selection. In other words, the users 102 being polled may select from a predetermined multiple choice answer or write-in an answer.

The poll requester can further select one or more targets 310 for desired respondents by indicating an age range and/or sex associated with the polled users. The age range may be predetermined and selected from a drop down menu or the poll requester may specify a custom age range, one or more specific ages, and so forth. According to some embodiments, the poll requester can identify keywords or profile types that the poll requester wishes to target with the poll being requested.

The poll requester can also select a location 312 to associate with the poll 302. For example, the poll related to the "upcoming election" in the screen shown in FIG. 3 is associated with all locations. However, if the poll related to a local upcoming election, a local city may be selected. Any location 312 related to any topic may be selected or otherwise provided by the requester.

A number of desired responses 314 may be selected or input by the poll requester. The number of responses 314 can identify the maximum number of the responses needed. A minimum number of responses or a range of acceptable responses may also be selected according to some embodiments. The poll requester may identify a number of responses required for a group of polls and allocate an ideal number of responses for each poll within the group of polls. Groups of polls may be distinct from one another or related. For example, the users 102 that select "Hillary Clinton" in the "upcoming election" poll 302 may also be queried regarding campaign funding in a related poll, while favorite cereal types may be queried in a different poll. Any group of polls may be requested related to any common area or range of subject matter.

A duration of the poll may also be selected according to some embodiments. The duration may be specified by the polling engine 106 or may be requested by the poll requester and may be in terms of real time, number of responses, or a combination. For example, the polling engine 106 may indicate that it is likely to take four hours to complete a poll for which a maximum of 400 answers is desired by the poll requester. In another example, the poll requester may request completion of the poll within 3 hours, or any other increment of time. The polling engine 106 may estimate the amount of time it takes to gather the answers based on previous polls, for example. The duration of the poll may be correlated with bid prices, so that polls with higher bids receive faster results. Any method for estimating the amount of time needed to gather answers to a poll is within the scope of various embodiments.

As discussed herein, a bid price 316 for each of the responses 314, a bid per user, and/or a bid per impression, may also be selected or bid by the poll requester. The price for each response, each of the users 102, and/or each impression may be multiplied by the number of responses desired for a total bid price. As discussed herein, any of these numbers may then be utilized by the polling engine 106 to determine which polls requested are fulfilled. The requested polls may be fulfilled in a hierarchical order according to the bid price, such as in an auction using either a per user price or the total price. According to some embodiments, only the poll with the highest bid price is fulfilled within a certain period of time, such as every hour or every day. Polls with lower bids may thus take longer to fulfill than the polls with higher bids. However, other criteria, such as subject matter, affiliation with the network, and so forth may also be utilized to decide when to fulfill one or more polls in addition to the auction of the bids per answer, per user 102, per impression, etc. For example, an advertiser that often advertises with a particular website may have the advertiser's polls prioritized based on affiliation with the particular website and/or a high price bid per impression, or a price for each impression to targeted users.

According to some embodiments, the poll may be prioritized based on a combination of the level of a bid and the expected time for performance of the poll. Thus, a poll that the polling engine 106 expects will receive the maximum number of responses easily may be ranked higher due to the ability to easily fulfill the poll while a poll in which the maximum number of responses will be difficult or more time consuming to obtain may be ranked lower due to the difficulty of fulfilling the poll. As discussed herein, any criteria may be utilized to rank or prioritize various polls.

After the poll requester completes the order and bid for the poll, the poll requester can select a "finish and pay" button, or any other mechanism for submitting the order. Although the poll creation screen 300 illustrates various options for providing a poll query, answers to the poll query, target audience, location, and bids, less or more information may be provided via the poll creation screen 300 and still fall within the scope of various embodiments.

Figure 4:
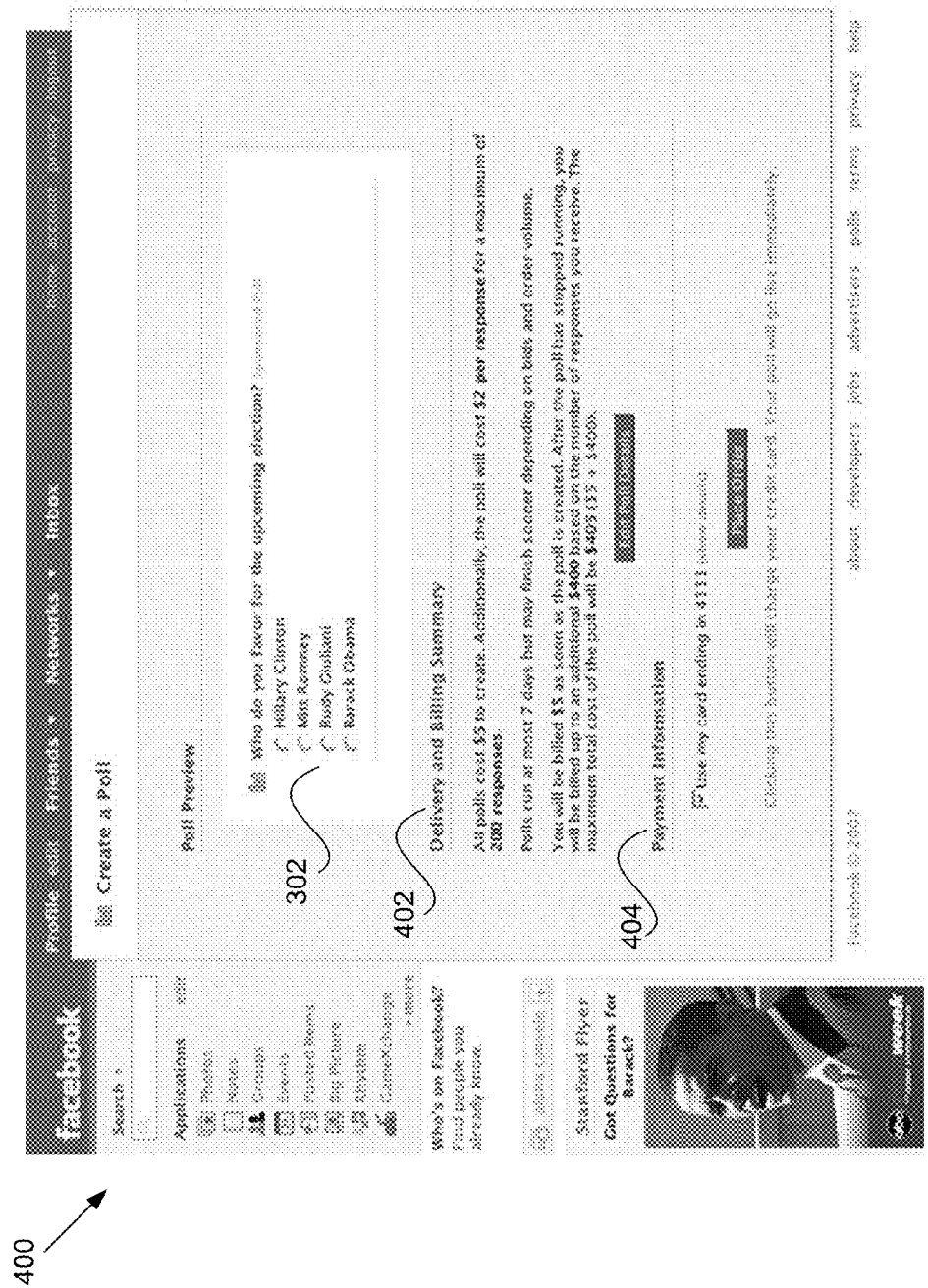
FIG. 4 illustrates an exemplary order confirmation screen.

FIG. 4 illustrates an exemplary order confirmation screen 400. The order confirmation screen 400 allows the poll requester to preview the poll 302 input on the poll creation screen, such as the poll creation screen 300 shown in FIG. 3. The order confirmation screen 400 also provides a delivery and billing summary 402 to the poll requester. Any type of summary may be provided to the poll requester. Although the summary in FIG. 4 indicates delivery and billing information, any type of summary, such as a summary of demographic information, target information, location information, and so forth may be summarized for the poll requester.

According to some embodiments, a bid for the poll may be declined. For example, a poll associated with a higher bidder may be chosen by the polling engine 106 over a lower bidder for the same or similar poll. A screen may be displayed that indicates to the poll requester that the poll request cannot be fulfilled, the poll request is declined, or any other desired message. Any type of process, display, etc. for accepting or declining poll order requests is within the scope of various embodiments.

If the poll requester wishes edit the details of the poll, the poll requester may return to the poll creation screen 300 from the order confirmation screen 400 to edit the details of the poll 302. Any other mechanism for editing the poll, such as a pop up window, may alternatively be provided.

Payment information 404 may also be provided via the order confirmation screen 400. Although the order confirmation screen 400 in FIG. 4 indicates that the poll will "go live immediately" when the "place order" button is selected, the poll 302 may be posted or fulfilled in any manner or according to any timeline according to various embodiments.

As discussed herein, the poll requester may indicate groups of users 102 to which the poll 302 should be sent or targeted. Although FIG. 3 indicates that the users 102 may be selected for targeting according to age and sex, any other parameters may be selected for targeting polls. For example, profile characteristics of the users 102 or participation in other types of polls may be utilized to target a current poll.

Figure 5:
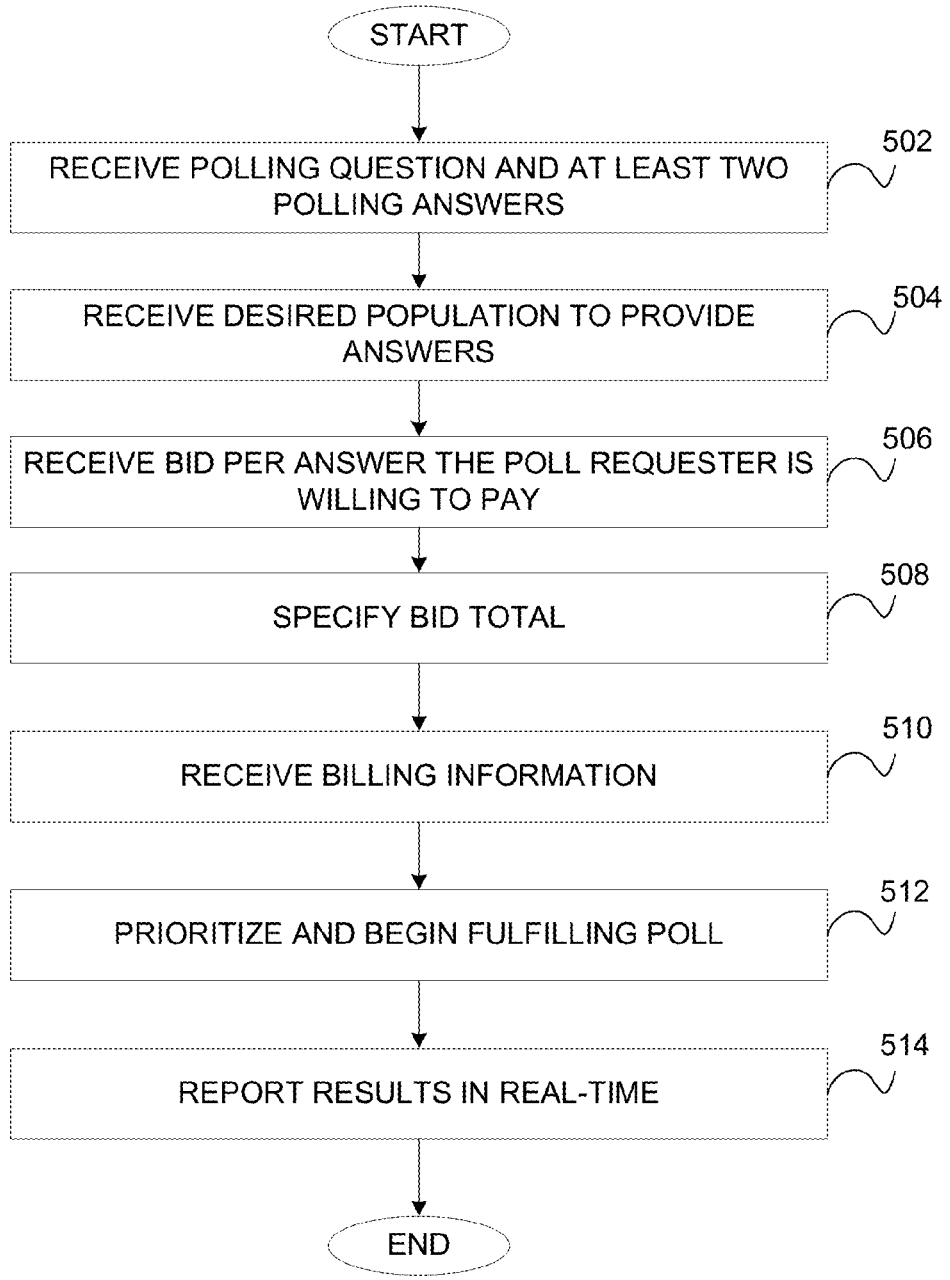
FIG. 5 illustrates a flow chart of an exemplary process for reporting results to a poll requester.

FIG. 5 shows a flow chart of an exemplary process for conducting a poll and reporting results to a poll requester. At step 502, a polling question and at least two possible answers to the polling question are received, such as the poll 302 discussed in FIG. 3. Any type of polling question may be provided, selected from a menu, or selected based on a suggestion from the polling engine 106.

At step 504, an indication of a desired population to provide answers to the poll is received, such as the targets 310 discussed in FIG. 3. The targets 310 may include school type, age, sex, network, and so forth.

At step 506, the polling engine 106 receives a bid amount that the poll requester is willing to pay. The poll requester may be willing to pay per user, per impression, and so forth, as discussed herein.

At step 508, the polling engine 106 specifies the bill total for the poll requester based upon the bid amount. As discussed herein, the bid may vary for different bid types. The poll requester may specify different bids for different user types answering the same poll. The polling engine 106 may fulfill and/or prioritize the poll based on the various bid types. For example, different types of impressions, users, and so forth may be bid differently by the poll requester. As discussed herein, MIT students that provide answers may be paid for at a higher rate than Harvard students. Similarly, the price per answer when the poll is accessed from a central social networking page associated with a social networking website may be higher than when the poll is accessed via an advertisement associated with the social networking website. Any type of bids based on any type of data, grouping, and so forth may be entered by the poll requester or provided as a selection by the polling engine 106.

At step 510, the billing information is received. At step 512, the poll is prioritized and fulfilled. The results of the poll are then reported in real-time to the poll requester, at step 514. According to some embodiments, the results of the poll may be reported to other users 102, such as users that recently answered the poll question, users visiting a screen on which the poll question is displayed for answer, and so forth. The poll requester and/or the polling engine 106 can determine which users 102 can access the poll results, according to some embodiments. Although step 514 indicates that the poll results are reported in real time, the poll results may be reported to the poll requester or any other users 102 at any point in time, according to other embodiments.

Figure 6:
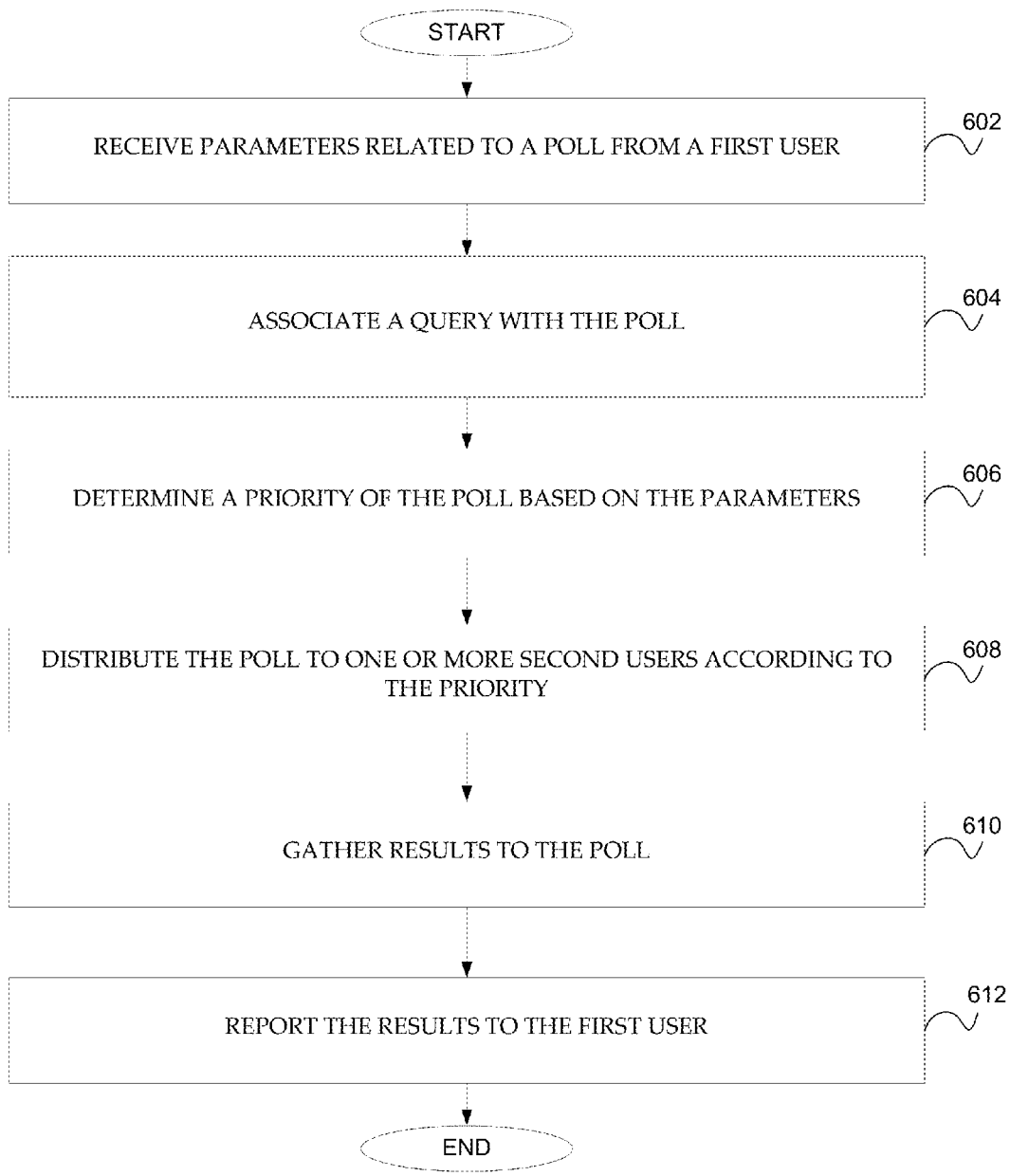
FIG. 6 shows a flow chart showing an exemplary process for online polling.

FIG. 6 shows a flow chart showing an alternative exemplary process for online polling. At step 602, parameters related to a poll are received from a first user. The parameters may comprise subject matter, a timeframe in which the poll results are needed, the number of poll answers desired, a price per answer the poll requester is willing to pay, such as monetary bids, a points system for bidding, a bid per user, a bid per impression, and so forth.

Also discussed herein, the first user may comprise a member of the social network or any other user. The first user may request the poll via the poll creation screen, as shown in FIG. 3. The poll creation screen may be accessed via any interface, as discussed herein.

At step 604, a query is associated with the poll. The poll requester may associate one or more queries with the poll, as shown in FIG. 3. In some embodiments, the polling engine may automatically generate one or more queries according to subject matter provided by the poll requester. Alternatively, the poll requester can select one or more queries from a drop down menu and the polling engine can incorporate the subject matter into the query selected. For example, the poll requester can enter music artists for answer choices and a query category labeled favorite music artists from a drop down menu. The polling engine can then generate a query that asks users "which of the below music artists is your favorite new artist?" Any type of query may be generated based on information provided by the poll requester.

At step 606, a priority of the poll is determined based on the parameters. A poll may be fulfilled before another poll or conducted instead of another poll based on the parameters. For example, the polling engine may gather and return results to the requester with the highest bid per answer before other poll results are returned to other requesters.

The priority of a poll may change depending upon the particular poll and the parameters. For example, based on parameters including response rates to the particular poll, the priority of the particular poll may change as it is conducted by the polling engine. Priority may also be calculated on a per user basis, as discussed herein, such as when the polling engine determines that certain users are more likely to respond to some polls.

At step 608, the poll is then sent to one or more second users, such as the users associated with a social networking website, according to the priority. The first user may comprise the poll requester, as discussed herein, that belongs to a network in common with the one or more second users or the first user may not be associated with the network. In other words, any user can request a poll, whether or not the user is associated with the one or more second users via a common network, a common website, and so forth.

An incentive may be provided to the users for answering the one or more queries associated with the poll. For example, the users may receive points, coupons, and so forth for answering the queries associated with the poll. The queries associated with the poll may be nested according to some embodiments. In other words, if the user selects choice #3, the user may be asked another query related to the choice #3. For example, in FIG. 2, if the user selects "Hillary Clinton", the user may be presented with a follow-up question about party affiliation. Any type of nested queries may be presented.

The poll may be sent to individual users, such as via email or posted or displayed to profile pages associated with each of the individual users, and/or the one or more queries may be displayed to a common area associated with a website. When the queries are displayed in a common area, the polling engine may compare the users that answer the poll with a profile associated with each of the users when a specific type of user is desired. For example, if the poll indicates that only blue-eyed users should answer, the polling engine may compare the users that answer the poll with their profiles to ensure that they have blue eyes and disregard answers from other users. In other embodiments, the polling engine may indicate to the users a group that is desired to answer the poll and may either prevent other users from answering the poll at all or not register the users' answers.

According to other embodiments, the users to which the poll is distributed may be balanced based on an automated sample balancing, so that the users are representative of a population of users being sampled.

At step 610, results to the poll may then be gathered. As discussed herein, the results may be gathered over any period of time. The results may be gathered according to a "winner" of the auction or according to any other criteria, as discussed herein.

At step 612, the results are then reported to the first user, such as the poll requester. The results may be categorized according to demographics, target audience, answer types, and so forth. Any data may be provided with the raw answers. According to some embodiments, the answers may be utilized to automatically generate other polls or queries.

The results may be reported to the poll requester in real-time or according to any other method. The raw answers may be reported in real-time while analytical data associated with the raw answers are reported at a later time. Any type of results may be reported to the poll requester in real time.

According to some embodiments, a user that answers the query associated with the poll can access the results of the poll gathered up to the time the user answers or a subset of the results to the poll. As discussed herein, polls may be automatically generated based on answers to previous polls. In some embodiments, the poll requester can schedule polls to run automatically at various intervals and to update the polls based on previous poll results, if desired. As also discussed herein, the priority of a poll may change as the poll runs its course. The polling engine can provide previous poll results to the poll requester based on similarity of the poll requested to other polls previously conducted, according to some embodiments. Polls can be delivered in any manner, as discussed herein, such as posted to a page, delivered with advertisements, accompanying a news story, and so forth.

The above-described components and functions can be comprised of instructions that are stored on a computer-readable storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with the invention. Those skilled in the art are familiar with instructions, processor(s), and storage medium.

While various embodiments have been described above, it should be understood that they have been presented by way of example only, and not limitation. For example, any of the elements associated with polling engine 106 may employ any of the desired functionality set forth hereinabove. Thus, the breadth and scope of a preferred embodiment should not be limited by any of the above-described exemplary embodiments.

What is claimed is:

1. A method comprising:
   receiving bidding information from one or more external systems for each of a plurality of polls by a server system, each poll comprising a query;
   receiving a request for content from a viewing user;
   determining an expected response rate of the viewing user for one or more of the plurality of polls;
   determining, by the server system, an expected performance value for the one or more polls, the expected performance value for a poll based on the bidding information and the determined expected response rate for the poll;
   selecting, by the server system, a poll from the one or more polls based on the determined expected performance values for the one or more polls; and
   providing the selected poll from the server system for display to the viewing user.

2. The method of claim 1, wherein the bidding information includes a bid per answer.

3. The method of claim 1, wherein the bidding information includes a bid per group of users.

4. The method of claim 1, wherein the bidding information includes a bid per impression associated with the poll.

5. The method of claim 1, further comprising gathering results of the selected poll and generating new queries based on the results.

6. The method of claim 1, wherein providing the selected poll to the viewing user comprises displaying the query of the selected poll on a page associated with the viewing user.

7. The method of claim 1, further comprising selecting an additional user based on automated sample balancing; and
   providing the selected poll for display to the additional user.

8. The method of claim 1, wherein the one or more external systems comprise an advertiser system.

9. The method of claim 1, wherein the selected poll is provided for display to the viewing user with an advertisement.

10. The method of claim 1, wherein the bidding information comprises different bid amounts based on a context in which the poll is presented to the viewing user.

11. A non-transitory computer readable storage medium having embodied thereon a program, the program being executable by a processor for performing a method comprising:
    receiving bidding information from one or more external systems for each of a plurality of polls by a server system, each poll comprising a query;
    receiving a request for content from a viewing user;
    determining an expected response rate of the viewing user for one or more of the plurality of polls;
    determining, by the server system, an expected performance value for the one or more polls, the expected performance value for a poll based on the bidding information and the determined expected response rate for the poll;
    selecting, by the server system, a poll from the one or more polls based on the determined expected performance values for the one or more polls; and
    providing the selected poll from the server system for display to the viewing user.

12. The computer readable storage medium of claim 11, wherein the one or more external systems comprise an advertiser system.

13. The computer readable storage medium of claim 11, wherein the selected poll is provided for display to the viewing user with an advertisement.

14. The computer readable storage medium of claim 11, wherein the bidding information includes a bid per answer.

15. The computer readable storage medium of claim 11, wherein the bidding information includes a bid per group of users.

16. The computer readable storage medium of claim 11, wherein the bidding information comprises different bid amounts based on a context in which the poll is presented to the viewing user.

17. The computer readable storage medium of claim 11, wherein the viewing user is a member of a social networking system.

18. A method comprising:
    receiving information for a plurality of polls, each poll comprising a query and a set of answers associated with the query;
    receiving a request for content from a viewing user;
    determining an expected response rate of the viewing user for one or more of the plurality of polls;
    determining, by the server system, an expected performance value for the one or more polls, the expected performance value for a poll based on bidding information included in the information received from the poll and the determined expected response rate for the poll;
    selecting, by the server system, the poll from the one or more polls based on the determined expected performance values for the one or more polls; and
    providing the selected poll from the server system for display to the viewing user.

19. The method of claim 18, wherein the information for the plurality of polls is received from an external system.

20. The method of claim 19, wherein the external system comprises an advertiser system.

21. The method of claim 18, wherein the selected poll is provided for display to the viewing user with an advertisement.

* * * * *